United States Patent
Fleming et al.

(10) Patent No.: US 7,305,328 B1
(45) Date of Patent: *Dec. 4, 2007

(54) METHOD AND APPARATUS FOR PREDICTING AND REPORTING A REAL ESTATE VALUE BASED ON A WEIGHTED AVERAGE OF PREDICTED VALUES

(75) Inventors: Mark Fleming, Vienna, VA (US); Chionglong Kuo, Arlington, VA (US)

(73) Assignee: Fannie Mae, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/975,337

(22) Filed: Oct. 29, 2004

Related U.S. Application Data

(63) Continuation of application No. 10/324,075, filed on Dec. 20, 2002, now Pat. No. 6,876,955.

(60) Provisional application No. 60/342,842, filed on Dec. 28, 2001.

(51) Int. Cl.
*G06F 17/60* (2006.01)

(52) U.S. Cl. .................. 702/194; 702/181; 702/182; 705/35

(58) Field of Classification Search ............. 702/181, 702/182, 194; 705/351, 38; 706/15, 16, 706/21
See application file for complete search history.

(56) References Cited

U.S. PATENT DOCUMENTS

| | | | | |
|---|---|---|---|---|
| 5,361,201 A | * | 11/1994 | Jost et al. ............. | 705/35 |
| 6,401,070 B1 | * | 6/2002 | McManus et al. ...... | 705/1 |
| 6,510,419 B1 | * | 1/2003 | Gatto ................... | 705/36 R |
| 6,609,109 B1 | * | 8/2003 | Bradley et al. ......... | 705/35 |
| 6,609,118 B1 | | 8/2003 | Khedkar et al. | |
| 6,681,211 B1 | * | 1/2004 | Gatto ................... | 705/36 R |
| 2003/0046199 A1 | * | 3/2003 | Murase et al. ......... | 705/35 |
| 2003/0078878 A1 | * | 4/2003 | Opsahl-Ong ........... | 705/38 |
| 2004/0010443 A1 | * | 1/2004 | May et al. ............. | 705/10 |

OTHER PUBLICATIONS

Anandalingam, G. & Chen, L., "Linear Combination of Forecasts: A General Bayesian Model", *J. of Forecasting*, Jul./Sep. 1989, 8(3), pp. 199-214.

Andrews, R.L. & Ferguson, J.T., "Integrating Judgement with Regression Appraisal", *Real Estate Appraiser and Analyst*, Spring 1986, pp. 71-74.

(Continued)

*Primary Examiner*—Carol S. W. Tsai
(74) *Attorney, Agent, or Firm*—Rader Fishman & Grauer PLLC

(57) ABSTRACT

A system and method of accurately predicting and reporting a value of a property based on a weighted average of values predicted by at least two prediction models. The system and method include the steps of accessing predicted values, determined by the prediction models, for the property; determining property-specific proportional prediction error distribution information for each predicted value determined by each prediction model; assigning a weight to the predicted value determined by each prediction model by using the property-specific proportional prediction error distribution information; and generating a property-specific weighted average value based on combination of the weight and the predicted value determined by each prediction model and reporting the property-specific weighted average value to minimize prediction error during prediction of the property value.

20 Claims, 5 Drawing Sheets

| | Repeat Sales 402 | Tax 404 | Hedonic 406 | Neural Network 408 | Weighted Model 410 | Frequency 412 |
|---|---|---|---|---|---|---|
| 4 Models | 0.0155 | 0.0158 | 0.0247 | 0.0347 | 0.0124 | 3,685,798 |
| 3 Models | 0.0142 | 0.0204 | 0.0184 | 0.0322 | 0.0123 | 2,771,223 |
| 2 Models | 0.0139 | 0.0155 | 0.0442 | 0.0627 | 0.0112 | 14,158,943 |
| 1 Model | 0.0152 | 0.0172 | 0.0600 | 0.0696 | - | 28,238,658 |

OTHER PUBLICATIONS

Armstrong, J.S., "Combining Forecasts: The End of the Beginning or the Beginning of the End?", *Int'l J. of Forecasting*, 1989, 5, pp. 585-588.

Bates, J.M. & Granger, C.W.J., "The Combination of Forecasts", *OR Quarterly*, Operational Research Society, Dec. 1969, 20(4), pp. 451-468.

Bischoff, C.W., "The Combination of Macroeconomic Forecasts", *J. of Forecasting*, Jul./Sep. 1989, 8(3), pp. 293-314.

Bunn, D., "Forecasting With More than One Model", *J. of Forecasting*, Jul./Sep. 1989, 8(3), pp. 161-166.

Case, B. & Quigley, J.M., "The Dynamics of Real Estate Prices", *Rev. of Econ. & Stats.*, Feb. 1991, 73(1), pp. 50-58.

Clemen, R.T., "Combining Forecasts: A Reveiw and Annotated Bibliography", *Int'l J. of Forecasting*, 1989, 5, pp. 559-583.

Diebold, F.X., "Forecast Combination and Encompassing: Reconciling Two Divergent Literatures", *Int'l J. Forecasting*, 1989, 5, pp. 589-592.

Flore, B.E. & White, E.M., "Subjective Versus Objective Combining of Forecasts: an Experiment", *J. of Forecasting*, Jul./Sep. 1989, 8(3), pp. 331-341.

Gau, G.W. et al., "Optimal Comparable Selection and Weighting in Real Property Valuation: an Extension", *J. of the AREUEA*, 1992, 20(1), pp. 107-123.

Gilley, O.W. & Pace, R.K., "A Hybrid Cost and Market-Based Estimator for Appraisal", *J. of Real Estate Research*, 1990, 5(1), pp. 75-88.

Granger, C.W.J., "Forecasting in Business and Economics", $2^{nd}$ Edition, Academic Press, USA, 1989, pp. 153-165.

Granger, C.W.J. & Newbold, P., "Forecasting Economic Time Series", $2^{nd}$ Edition, Academic Press, USA, 1986, pp. 265-276.

Granger, C.W.J., "Invited Review: Combining Forecasts—Twenty Years Later", *J. of Forecasting*, Jul./Sep. 1989, 8(3), pp. 167-173.

Granger, C.W.J. & Ramanathan, R., "Improved Methods of Combining Forecasts", *J. of Forecasting*, Apr./Jun. 1984, 3(2), pp. 197-204.

Guerard, J.B. Jr., "Composite Model Building for Foreign Exchange Rates", *J. of Forecasting*, Jul./Sep. 1989, 8(3) pp. 315-329.

Guerard, J.B. Jr. & Clemen, R.T., "Collinearity and the Use of Latent Root Regression for Combining GNP Forecasts", *J. of Forecasting*, Jul./Sep. 1989, 8(3), pp. 231-238.

Guerrero, V.M., "Optimal Conditional ARIMA Forecasts", *J. of Forecasting*, Jul./Sep. 1989, 8(3), pp. 215-229.

Gunter, S.I. & Aksu, C., "N-Step Combinations of Forecasts", *J. of Forecasting*, Jul./Sep. 1989, 8(3), pp. 253-267.

Hallman, J. & Kamstra, M., "Combining Algorithms Based on Robust Estimation Techniques and Co-Intergrating Restrictions", *J. of Forecasting*, Jul./Sep. 1989, 8(3), pp. 189-198.

Hill, R.C. et al., "Estimating Capital Assed Price Indexes", *Rev. of Econ. and Stats.*, May 1997, 79(2), pp. 226-233.

Hogarth, R.M., "On Combining Diagnostic 'Forecasts': Thoughts and Some Evidence", *Int'l J. of Forecasting*, 1989, 5, pp. 593-597.

Holden, K. & Peel, D.A., "Unbiasedness, Efficiency and the Combination of Economic Forecasts", *J. of Forecasting*, Jul./Sep. 1989, 8(3), pp. 175-188.

Holden, K. et al., "Economic Forecasting: An Introduction", 1989, Cambridge University Press, pp. 85-107.

Knight, J.R. et al., "Biased Prediction of Housing Values", *J. of the AREUEA*, 1992, 20(3), pp. 424-456.

Lockwood, L.J. & Rutherford, R.C., "Determinants of Industrial Property Value", *Real Estate Economics*, Summer 1996, 24(2), pp. 257-373.

Maddala, G.S., "Econometrics", 1977, McGraw-Hill, USA, pp. 314-317.

Mahmoud, E., "Combining Forecasts: Some Managerial Issues", *Int'l J. of Forecasting*, 1989, 5, pp. 599-600.

Makridakis, S., "Why Combining Works?", *Int'l J. of Forecasting*, 1989, 5, pp. 601-603.

Oliveira, R.A., "Combining Forecasts to Predict Property Values for Single-Family Resideneces: Comment", *Land Economics*, Nov. 1978, 54(4), pp. 524-527.

Pace, R.K. & Gilley, O. W., "Estimation Employing A Priori Information Within Mass Appraisal and Hedonic Pricing Models", *J. of Real Estate Finance & Economics* , 1990, 3, pp. 55-72.

Pace, R.K. & Gilley, O.W., "Appraisal Across Jurisdictions using Bayesian Estimation with Bootstrapped Priors for Secondary Mortgage Market Applications", *Prop. Taxj*, Mar. 1989, 8(1), pp. 27-42.

Pereira, B. et al., "Experience in Combining Subjective & Quantitative Forecasts of Open Market Rates", *J. of Forecasting*, 1989, 8(3), pp. 343-348.

Quigley, J.M., "A Simple Hybrid Model for Estimating Real Estate Price Indexes", *J. Housing Econ.*, Mar. 1995, 4(1), pp. 1-12.

Raftery, A. et al., "Model Selection and Accounting for Model Uncertainty in Linear Regression Models", Nov. 19, 1993, U of Washington, pp. 1-24.

Sessions, D.N. & Chatterjee, S., "The Combining of Forecasts Using Recursive Techniques With Non-Stationary Weights", *J. of Forecasting*, 1989, 8(3), pp. 239-251.

Smith, D.G.C., "Combination of Forecasts in Electricity Demand Prediction", *J. of Forecasting*, 1989, 8(3), pp. 349-356.

Wall, K.D. & Correia, C., "A Preference-Based Method of Forecast Combination", *J. of Forecasting*, 1989, 8(3), pp. 269-292.

Winkler, R.L., "Combining Forecasts: A Philosophical Basis & Some Current Issues", *Int'l J. of Forecasting*, 1989, 5, pp. 605-609.

Wong, S.K. et al., "Estimating Age Effects in Repeat-Sales Price Indices", *Proc. Of $2^{nd}$ Int'l Postgraduate Res. Conf. in the Built & Human Environ.*, Apr. 2002, U of Salford, England, pp. 290-300.

Wood, S., "Combining Forecasts to Predict Property Values for Single-Family Residences", *Land Economics*, May 1976, 52(2), pp. 221-229.

Wood, S., "Combining Forecasts to Predict Property Values for Single-Family Residences: Reply", *Land Economics*, Nov. 1978, 54(4), pp. 528-530.

\* cited by examiner

Figure 2-Variance vs. Prediction Size

|  | Repeat Sale | Tax | Hedonic | Neural Network |
|---|---|---|---|---|
| Repeat Sales | — | — | — | — |
| Tax | 0.431 | — | — | — |
| Hedonic | 0.365 | 0.648 | — | — |
| Neural Network | 0.366 | 0.590 | 0.847 | — |

Fig. 3

|  | Repeat Sales 402 | Tax 404 | Hedonic 406 | Neural Network 408 | Weighted Model 410 | Frequency 412 |
|---|---|---|---|---|---|---|
| 4 Models | 0.0155 | 0.0158 | 0.0247 | 0.0347 | 0.0124 | 3,685,798 |
| 3 Models | 0.0142 | 0.0204 | 0.0184 | 0.0322 | 0.0123 | 2,771,223 |
| 2 Models | 0.0139 | 0.0155 | 0.0442 | 0.0627 | 0.0112 | 14,158,943 |
| 1 Model | 0.0152 | 0.0172 | 0.0600 | 0.0696 | - | 28,238,658 |

Fig. 4

|  | Repeat Sales | Tax | Hedonic | Neural Network | Frequency |
|---|---|---|---|---|---|
| 4 Models | 0.435 | 0.329 | 0.212 | 0.024 | 3,685,798 |
| 3 Models | 0.498 | 0.586 | 0.472 | 0.015 | 2,771,223 |
| 2 Models | 0.560 | 0.441 | 0.523 | 0.143 | 14,158,943 |

Fig. 5

METHOD AND APPARATUS FOR PREDICTING AND REPORTING A REAL ESTATE VALUE BASED ON A WEIGHTED AVERAGE OF PREDICTED VALUES

This application is a continuation of U.S. patent application Ser. No. 10/324,075, filed Dec. 20, 2002 now U.S. Pat. No. 6,876,955, which claims the benefit under 35 U.S.C. § 119(e) of U.S. Provisional Application No. 60/342,842, filed Dec. 28, 2001, both entitled "Method & Apparatus for Predicting and Reporting a Real Estate Value Based on a Weighted Average of Predicted Values." The entire contents of these applications are hereby incorporated by reference.

FIELD OF THE INVENTION

The present invention relates to a method and apparatus for predicting the value of real estate based on a weighted average of predicted values from at least two different value prediction methods.

BACKGROUND OF THE INVENTION

Determining an accurate estimate of the value of a property is important to entities such as buyers, sellers, real estate agents, lenders, and financial institutions that participate in a real estate market. For example, accurate estimates enable sellers to formulate realistic expectations as to the values of the properties being sold and to set appropriate sales prices for those properties. Buyers, on the other hand, rely on accurate estimates to formulate offers for the purchase of properties. Lenders may use predicted property values to apply loan-to-value guidelines and lenders and financial institutions that buy and sell mortgages may depend on these estimates to determine the value of a particular mortgage or portfolio of mortgages and the risk associated with holding such mortgages.

There are several known methods for estimating the value of a property at a specified time, four of which are the hedonic or property characteristic methods, the repeat sales methods, the tax assessment methods, and the Neural Network methods. Hedonic methods estimate the value of a property by assigning values to attributes of the property and totaling the values. For example, a hedonic method may estimate the value of a home by assigning a value to the home style, the neighborhood, each bedroom, each bath room, etc.

Repeat sales methods of estimation use actual sales prices and time data points to estimate a market-level price index, wherein the present value of a property may be estimated using the prior sale information. For example, a repeat sales index model proposed by Bailey, Muth, and Nourse (the BMN model) specifies that the change in the logarithm price of a property over a known period of time is equal to a logarithmic price index plus and error term. Another repeat sales model by Case and Shiller (the Case-Shiller model) improves on the BMN method. Unlike the BMN model that assumes that the error term is independent, the Case-Shiller model assumes that the error term is a linear function of the time between sales.

Tax assessment methods rely upon historical tax assessment data to predict the value of a property or estimate a price index for a collection of properties. The tax assessment methods use the proportional relationship between assessed values in any given geographic area, such as metropolitan statistical areas (MSA's), counties, or zip code areas, and sale values to predict property values.

Neural Network methods predict property values using the same data and underlying principles as in the hedonic model. Neural Network methods use a network training process that forms multiple linear combinations of the property characteristic variables, passes these variables through "activation functions", then forms a linear combination of these results that is then compared with the desired output, i.e., the observed property value. Thereafter, the coefficients of the linear combinations are iteratively adjusted in an attempt to make the output of the network mimic the observed property value.

Each of the four methods referenced above for predicting property values do not predict the value of a property with absolute accuracy. Each method is considered to operate within acceptable bounds of accuracy and each method is expected to predict the value of a property within a few percent, for example 5%, of an actual sale price and within a certain percentage of the time, for example 15% of the time. To improve the overall prediction accuracy from currently available prediction methods, the values predicted by these methods may be averaged. However, some methods have been determined to be more accurate than others. Accordingly, there is a need to improve the accuracy of a prediction based on an average value.

SUMMARY OF THE INVENTION

The invention relates to a system and method of accurately predicting and reporting a value of a property based on a weighted average of values predicted by at least two prediction models. The method includes the steps of accessing predicted values, determined by the prediction models, for the property; determining property-specific proportional prediction error distribution information for each predicted value determined by each prediction model; assigning a weight to the predicted value determined by each prediction model by using the property-specific proportional prediction error distribution information; generating a property-specific weighted average value based on combination of the weight and the predicted value determined by each prediction model and reporting the property-specific weighted average value to minimize prediction error during prediction of the property value.

Additional features and advantages of the invention will be set forth in the description that follows, and in part will be apparent from the description, or may be learned by practice of the invention. The objectives and advantages of the invention will be realized and attained by the system and method particularly pointed out in the written description and claims hereof as well as the appended drawings.

BRIEF DESCRIPTION OF THE DRAWINGS

In order to assist the understanding of this invention, reference will now be made to the appended drawings, in which like reference numerals refer to like elements. The drawings are exemplary only, and should not be construed as limiting the invention.

FIG. 3 illustrates a correlation coefficients matrix for the PPE for four models;

FIG. 4 illustrates the average estimated mean PPE assigned to the 4, 3, 2, and 1 model categories; and FIG. 5 illustrates a summary of the reconciliation weights by different model combinations.

DESCRIPTION OF THE PREFERRED EMBODIMENTS

Reference will now be made in detail to the preferred embodiments of the present invention, examples of which are illustrated in the accompanying drawing. The present invention described below extends the functionality of the inventive system and method for predicting the value of a real estate based on a weighted average of predicted values from multiple value prediction methods.

Figure 1:
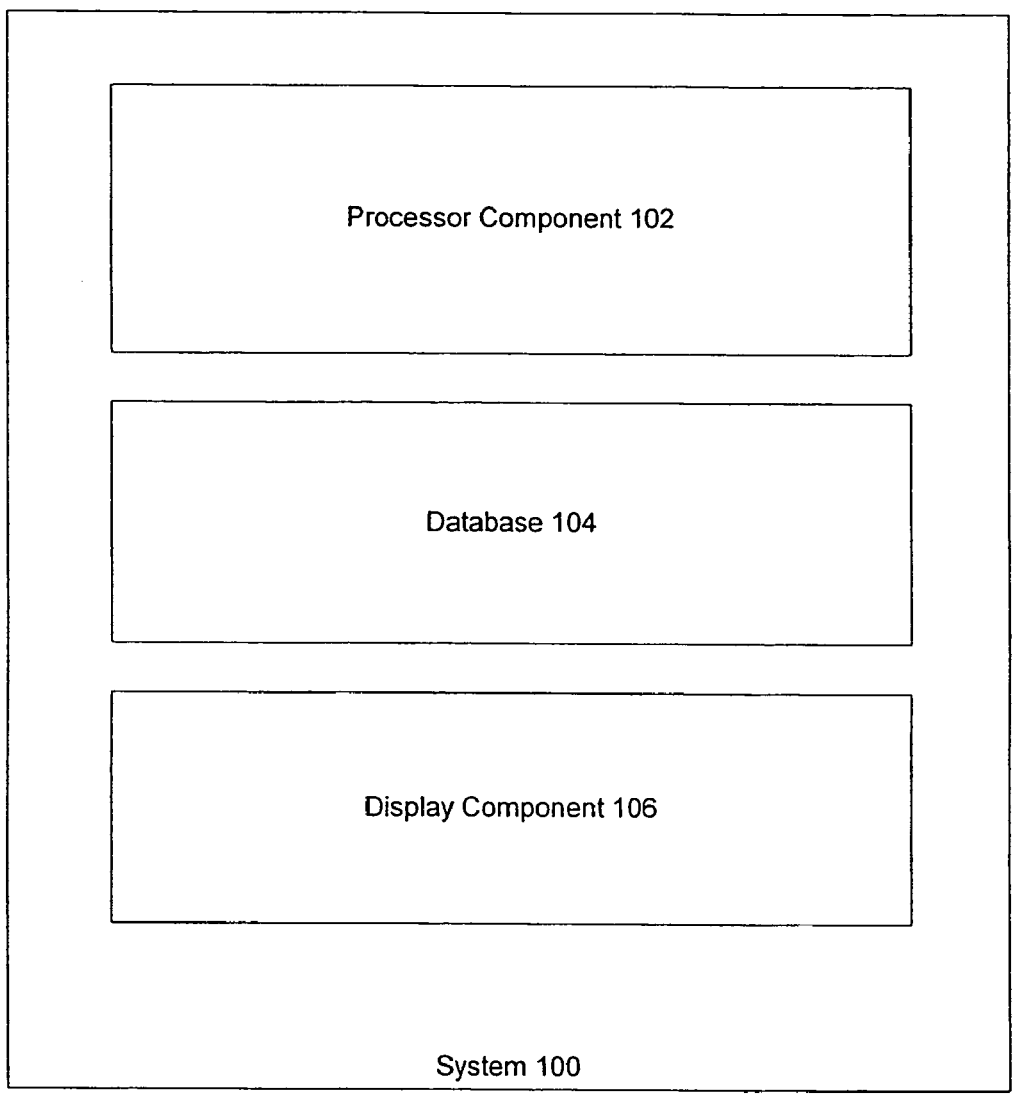
FIG. 1 is a diagram of a computing system in accordance with an embodiment of the present invention.

FIG. 1 illustrates a computer system 100 that is configured to predict the value of a real estate based on a weighted average of predicted values from multiple methods. Computer system 100 comprises a processor 102, a memory component 104 and a display component 106. Processor 102 may be programmed to implement a method for predicting and reporting real estate prices. Memory component 104 stores data used by processor 102 and display component 106 enables user interactions with computer system 100.

According to the invention, accuracy of the values predicted by a repeat sales (RS) model, a tax assessment (T) model, a hedonic or property characteristic (PC) model, and a Neural Network (NN) model may be improved by combining the predictions made by any combination of two or more of the methods and by weighting the predictions attributable to the individual methods prior to combining them, wherein greater weight is given to the more accurate methods of prediction relative to the less accurate methods.

Specifically, each of the prediction methods is associated with a proportional prediction error PPE. The PPE is the difference between the actual sale price and the predicted sale price for a property divided by the actual sale price. The PPE for a particular method may vary in relation to variables, such as sale price magnitude or sale-resale interval. The appropriate weight to be assigned to a particular method may vary in relation to the variance of the PPE for that method. Therefore, accuracy of a prediction made using a weighted combination of methods may be further improved by modifying the weight of a prediction attributed to a particular method based on the variance of the PPE for the method.

In the inventive system, the predicted values from any number of prediction methods/models may be combined to produce a weighted average value. In an embodiment of the invention, the values predicted by the (RS) model, the (T) model, the (PC) model, and the (NN) model are combined using weights obtained from a regression model.

The following steps demonstrate a method for determining the weighted average of four values predicted by four different models. It is apparent that one of ordinary skill in the art could routinely determine a weighted average for any number of models based on the concepts underlying the four model weighted average.

Specifically, if $P_i$ denotes the sale price, i.e. known value of property i, and let $P_{iR}$, $P_{iT}$, $P_{iPC}$, $P_{iNN}$ denote the values predicted by the RS model, the T model, the PC model, and the NN model, respectively, an unbiased weight for combining the four predicted values can be estimated using an ordinary least squares (OLS) regression. The weight can be estimated by using the following equation wherein:

$$P_i = W_{RS}P_{iRS} + W_T P_{iT} + W_{PC} P_{iPC} + (1 - W_{RS} - W_T - W_{PC})P_{iNN} + \epsilon_i \qquad \text{Equation 1}$$

where $W_{xx}$, $\forall xx = RS, T, PC$ is the model specific weight. In Equation 1, the condition is imposed that the sum of weights for all models is equal to one. Note that the Neural Network model reconciliation weight is chosen as the constrained weight, but any one of the model weights could have been chosen. Therefore, Equation 1 may be rewritten as:

$$P_i - P_{iNN} = W_{RS}(P_{iRS} - P_{iNN}) + W_T(P_{iT} - P_{iNN}) + W_{PC}(P_{iPC} - P_{iNN}) - \epsilon_i \qquad \text{Equation 2}$$

The error term in Equation 2 is likely to be heteroskedastic with the variance of the error positively correlated with the value of the properties. In other words, it is expected that the error associated with a predicted value will be related to the magnitude of the predicted value. To correct for the heteroskedasticity, both sides of Equation 2 may be divided by $P_i$. After this division and the rearrangement of the terms of the equation, the following relationship is obtained.

$$PPE_{iNN} = W_{RS}(PPE_{iNN} - PPE_{iRS}) + W_T(PPE_{iNN} - PPE_{iT}) + W_{PC}(PPE_{iNN} - PPE_{iPC}) + \epsilon_i \qquad \text{Equation 3}$$

where $PPE_{ixx} = (1 - P_{ixx}/P_i)$, $\forall\ xx = RS, T, PC, NN$, and is the proportional prediction error for the RS, T, PC, and NN models. Based on the foregoing, a column matrix of PPE values may be calculated for each model, wherein each individual PPE value is that for a particular property i. The model weights produced from OLS estimation of Equation 3 are:

$$\begin{bmatrix} W_{RS} \\ W_T \\ W_{PC} \end{bmatrix} = \begin{bmatrix} E[(PPE_{NN} - PPE_{RS})^2] & E[(PPE_{NN} - PPE_{RS})(PPE_{NN} - PPE_T)] & E[(PPE_{NN} - PPE_{RS})(PPE_{NN} - PPE_{PC})] \\ E[(PPE_{NN} - PPE_{RS})(PPE_{NN} - PPE_T)] & E[(PPE_{NN} - PPE_T)^2] & E[(PPE_{NN} - PPE_T)(PPE_{NN} - PPE_{PC})] \\ E[(PPE_{NN} - PPE_{RS})(PPE_{NN} - PPE_{PC})] & E[(PPE_{NN} - PPE_T)(PPE_{NN} - PPE_{PC})] & E[(PPE_{NN} - PPE_{PC})^2] \end{bmatrix}^{-1} * \begin{bmatrix} E[(PPE_{NN} - PPE_{RS})PPE_{NN}] \\ E[(PPE_{NN} - PPE)PPE_{NN}] \\ E[(PPE_{NN} - PPE_{PC})PPE_{NN}] \end{bmatrix} \qquad \text{Equation 4}$$

$$W_{NN} = 1 - W_{RS} - W_T - W_{PC}$$

Where E signifies a mean or "expected" value. Based on this formulation of the reconciliation scheme, the models with lower prediction error will have higher weights.

The inverse of the moment matrix in Equation 4 (which is the first matrix to the right of the equal sign) can be solved analytically. To simplify the notation of Equation 4 and solve the inverse of the moment matrix, the model can be rewritten as:

$$\begin{bmatrix} W_{RS} \\ W_T \\ W_{PC} \end{bmatrix} = \begin{bmatrix} a_{11} & a_{12} & a_{13} \\ a_{21} & a_{22} & a_{23} \\ a_{31} & a_{32} & a_{33} \end{bmatrix}^{-1} \begin{bmatrix} c_1 \\ c_2 \\ c_3 \end{bmatrix} \qquad \text{Equation 5}$$

or in matrix form as $W=A^{-1}C$, where the elements of A are denoted by $a_{ij}$ and the elements of C by $c_i$. The diagonal elements in A are described in terms of variances and covariances in:

$$a_{kk}=E[(PPE_{NN}-PPE_{xx})^2]=\sigma^2_{NN}+\sigma^2_{xx}-2\rho_{NNxx}\sigma_{NN}\sigma_{xx}+E[(PPE_{NN}-PPE_{xx})]^2 \quad \text{Equation 5.1}$$

where kk is 11, 22, and 33 and xx is RS, T, and PC, respectively.

the off diagonal terms of A are described in:

$$a_{ij}=E[(PPE_{NN}-PPE_{xx})(PPE_{NN}-PPE_{yy})]$$

$$=\sigma_{NN}-\rho_{NNxx}\sigma_{NN}\sigma_{xx}-\rho_{NNyy}\sigma_{NN}\sigma_{yy}+\rho_{xxyy}\sigma_{xx}\sigma_{yy}+\tfrac{1}{2}([E(PPE_{NN}-PPE_{xx})]^2+[E(PPE_{NN}-PPE_{yy})]^2-[E(PPE_{xx}-PPE_{yy})]^2) \quad \text{Equation 5.2}$$

where i,j=1, 2, and 3 and xx, yy=RS, T, and PC, respectively.

and the elements of C are described in:

$$c_k=E[(PPE_{NN}-PPE_{xx})PPE_{NN}]=\sigma^2_{NN}-\rho_{NNxx}\sigma_{NN}\sigma_{xx}+[E(PPE_{NN})]^2-E(PPE_{NN})E(PPE_{xx}) \quad \text{Equation 5.3}$$

where k is 11, 22, and 33 and xx is RS, T, and PC, respectively.

Figure 2:
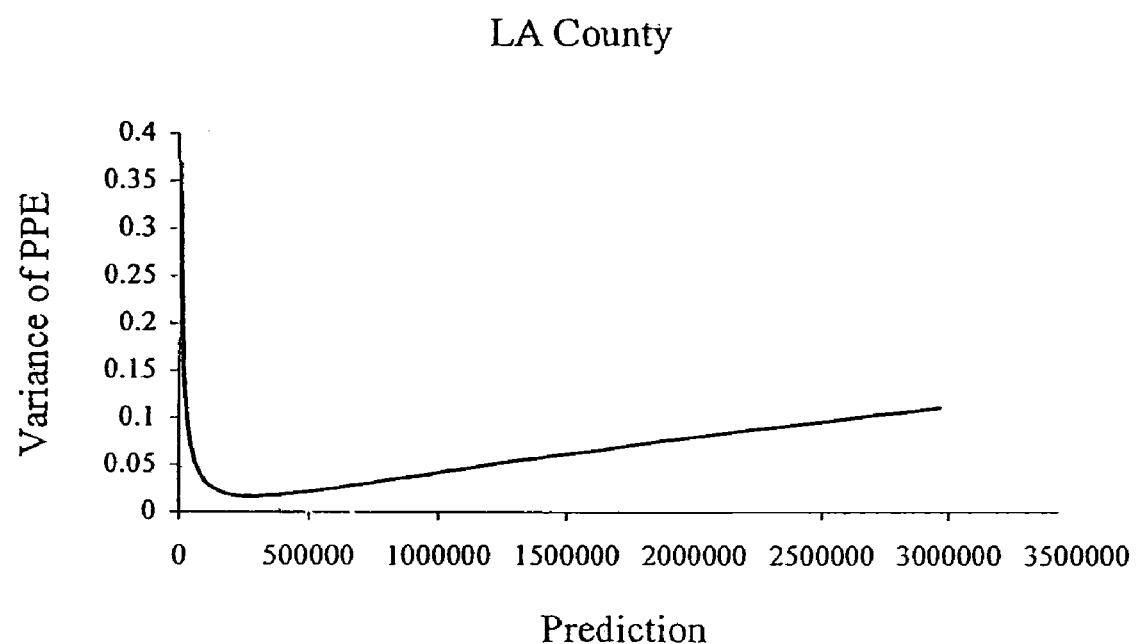
FIG. 2 is a graph of PPE variance versus predicted property value.

In Equations 5.1-5.3, $\rho$ is the correlation coefficient between any two different models. The $\rho_{xxyy}(\forall xx$=RS, T, PC, NN and yy=RS, T, PC, NN, where xx≠yy) values may be determined by performing a simple correlation of the PPE values for any pair of two different models. FIG. 2 illustrates the relationship of PPE variance and property value for the physical characteristic model.

The values for $\sigma$ (standard deviation or variance) for each model are provided by determining the standard deviation for the set of PPE's that exist for the model. The relationship of the standard deviation and the correlation coefficient for any two models is provided by the equation $\rho_{xxyy}=\sigma_{xxyy}/[(\sigma_{xx})(\sigma_{yy})]$, where $\sigma_{xxyy}$ is the covariance between any two models xx, and yy.

With renewed reference to Equation 5, let $B=A^{-1}=1/|A|$ adj(A), where the elements of B are denoted by $b_{ij}$, so that $W=B*C$. The inverse solution is a symmetrical matrix that takes the following form element by element:

$$b_{11}=(1/|A|)*(a_{22}a_{33}-a_{32}a_{23})$$

$$b_{12}=b_{21}=-(1/|A|)*(a_{21}a_{33}-a_{31}a_{23})$$

$$b_{13}=b_{31}=(1/|A|)*(a_{21}a_{32}-a_{31}a_{22})$$

$$b_{22}=(1/|A|)*(a_{11}a_{33}-a_{31}a_{13})$$

$$b_{23}=b_{32}=-(1/|A|)*(a_{11}a_{32}-a_{31}a_{12})$$

$$b_{33}=(1/|A|)*(a_{11}a_{22}-a_{12}a_{21})$$

$$|A|=a_{11}a_{22}a_{33}+a_{21}a_{32}a_{13}+a_{31}a_{12}a_{23}-a_{31}a_{22}a_{13}-a_{11}a_{32}a_{23}-a_{33}a_{21}a_{12} \quad \text{Equation 6}$$

Based on this solution of the inverse matrix, the final form of the reconciliation weights can be written as, $$\begin{bmatrix} W_{RS} \\ W_T \\ W_{PC} \end{bmatrix} = \begin{bmatrix} b_{11} & b_{12} & b_{13} \\ b_{21} & b_{22} & b_{23} \\ b_{31} & b_{32} & b_{33} \end{bmatrix} * \begin{bmatrix} c_1 \\ c_2 \\ c_3 \end{bmatrix} \quad \text{Equation 7}$$

$$W_{NN}=1-W_{RS}-W_T-W_{PC}$$

Equation 7 can be solved for each of the reconciliation weights. For example, the solution for the repeat sales reconciliation weight is provided by the equation:

$$W_{RS}=b_{11}*c_1+b_{12}*c_2+b_{13}*c_3.$$

The OLS regression model described in Equations 1-3 may not actually be run due to the segmentation of the data based on correlation between PPE variance and time intervals for the RS and T models, or between PPE variance and value magnitude for the PC and NV models. As a result of this segmentation, the amount of data available for regression for each possible combination of models may be too small and difficult to implement. By analytically solving the OLS regression, Equation 7 may be used to determine the weights using property level PPE variances/means ($\sigma$) for all of the models, and county level correlation coefficients ($\rho$) of PPE between any two models. As a result, all unknowns may be solved by substituting known PPE's, $\sigma$'s, and $\rho$'s in Equation 7 based on the relationships established by Equations 5.1-5.3 and 6.

FIG. 3 illustrates a correlation coefficients matrix for the PPE for each of the four models discussed above. For each county, the correlation coefficients of PPE are estimated using sample correlation coefficients of in-sample PPE's. Based on the in-sample PPEs, all of the sample correlation coefficients in FIG. 2 are positive. This means that, in general, if one model predicts the value of a property well, the other models will do the same and vice versa. According to FIG. 2, the hedonic and Neural Network models have the highest correlation, followed by the tax model and hedonic model, and next by the tax model and Neural Network model. The repeat sales model has the weakest correlation with the other three models.

In addition to the four model case, three and two model case reconciliation models also may be derived from the inventive system. Given two, three, and four model weighting schemes, all possible combinations of model predictions can be categorized and assigned weights. In an embodiment of the invention, to create property specific PPE variance measures, non-linear empirical models are developed on a county level for each prediction model. FIG. 4 illustrates the average estimated mean PPE assigned to the 4, 3, 2, and 1 model categories. According to the invention, the closer to zero the mean PPE, the more accurate the model is. According to FIG. 4, the repeat sales model 402 is most accurate, followed by the tax 404, hedonic 406 and Neural Network 408 models, in that order. The reconciliation scheme produces a weighted model 410, which is more accurate than any other model, thereby indicating the reconciliation scheme is working effectively. The frequency 412 column of FIG. 4 indicates the number of properties for which there was usable data.

FIG. 5 illustrates a summary of the reconciliation weights by different model combinations. Higher weights indicate models with greater influence in the final weighted values. In the four model case, the general model hierarchy can be seen as repeat sales, tax, hedonic and Neural Network models.

In the foregoing example, the weights for the averaging of multiple valuation models are determined using actual standard deviations ($\sigma$) that are based on actual PPE's. Use of actual PPE's, however, requires knowledge of an actual sale price as well as a predicted price. In some instances, only a predicted value or price is known. It has been determined that the foregoing method may still be used in these instances by substituting a predicted standard deviation ($\hat{\sigma}$) for the actual standard deviation in Equations 5.1-5.3.

Predicted standard deviations may be determined as a result of the existence of a correlation between PPE variance and certain variables, depending upon the model under consideration. For the repeat sales and tax assessment models, a correlation exists between PPE variance and the interval of time since the last sale or last tax assessment. For the repeat sales model, the longer the prediction time interval, the higher the dispersion of PPE. As a result, weights for the repeat sales model should be lower for longer prediction intervals relative to other models. Similarly, a positive correlation has been observed between the tax assessment model prediction interval, i.e., the interval from assessment time to prediction reference time, and the PPE variance of the tax assessment model. As a result, the tax model may also be expected to have a relatively lower weight when the tax model prediction interval is longer.

The property characteristic and Neural Network models do not demonstrate a correlation between PPE variance and time interval as do the repeat sales and tax assessment models. Both the physical characteristic and the Neural Network models do demonstrate, however, a correlation between the PPE variance and the magnitude of the property value. Small and large predicted prices in terms of dollars have higher PPE variance relative to mid-ranged predicted values. According to FIG. 2, a sharp drop off in PPE variance is shown for low value predictions to moderate value predictions, followed by a more gradual increase in PPE variance as the predicted value increases. The relationship between PPE variance and another variable such as value or time interval may be modeled as follows. First, it is assumed that the difference between the log price and its predicted value for model xx (tax, property characteristic, and Neural Network models), $$\ln\left(\frac{\hat{P}_{ixx}}{P_i}\right),$$

is a normal distribution with mean zero, then the mean and variance of the model xx prediction error Mean(PPE$_{ixx}$) and Var(PPE$_{ixx}$) can be written as:

$$Mean(PPE_{ixx}) = Mean\left(\frac{\hat{P}_{ixx}}{P_i}\right) - 1 = \qquad \text{Equation 8}$$

$$Mean\left[\exp\left(\ln\left(\frac{\hat{P}_{ixx}}{P_i}\right)\right)\right] - 1 = \exp\left[Var\left(\ln\left(\frac{\hat{P}_{ixx}}{P_i}\right)\right)/2\right] - 1$$

and, $$Var(PPE_{ixx}) = Var\left(\frac{\hat{P}_{ixx}}{P_i}\right) = Var\left[\exp\left(\ln\left(\frac{\hat{P}_{ixx}}{P_i}\right)\right)\right] = \qquad \text{Equation 9}$$

$$\exp\left[Var\left(\ln\left(\frac{\hat{P}_{ixx}}{P_i}\right)\right)\right]\left\{\exp\left[Var\left(\ln\left(\frac{\hat{P}_{ixx}}{P_i}\right)\right)\right] - 1\right\}.$$

Assuming the relationship established by Equation 9, in the tax, property characteristic, and Neural Network models, an error variance model may be used to regress the squared model residuals on a quadratic function of the prediction interval (tax model) or prediction size (property characteristic and Neural Network models) to estimate the variance of the error. As a result, the following relationship is established:

$$(\hat{\sigma}_{xx})^2 = Var\left[\ln\left(\frac{\hat{P}_{ixx}}{P_i}\right)\right] = \alpha_1 y^2 + \alpha_2 y + \varepsilon \qquad \text{Equation 10}$$

where y and y$^2$ are the time interval or the value magnitude and the time interval or the value magnitude squared, respectively. Using an OLS method and substituting known values for $(\hat{\sigma}_{xx})^2$ and y, the values for $\alpha_1$ and $\alpha_2$ can be determined. Once these coefficients are known, $(\hat{\sigma}_{xx})^2$ can be determined for any property, even though actual sales data is unavailable for that property.

For the repeat sale model, the $$Var\left[\ln\left(\frac{P_{iR}}{P_i}\right)\right]$$

the can be obtained from the second stage regression of the Case-Shiller three stage estimation procedures.

The new framework for determining the prediction model variances and the model weights incorporate the concept of prediction interval (tax and repeat sales models) and prediction size (property characteristic and Neural Network models). The prediction interval and prediction size determine the size of the prediction error through the estimated variance functions, which in turn determines the predicted variance. The use of prediction interval and prediction size to calculate the predicted variance in the tax, property characteristic, and Neural Network models makes their predicted variances consistent with the repeat sales model predicted variance. The prediction intervals and prediction sizes are the major factors in determining the model weights because the weights are inversely related to the variance of the prediction error. Thus, a property with a larger variance will have lower weight and vice versa.

In addition to the reconciliation and weighting of multiple predictions, an exclusion filter may be applied to the property characteristic and Neural Network models prior to application of the reconciliation scheme. This may be done to remove obvious prediction outliers from the models. Using the log variance model, the probability that the predicted value is within +/−5% PPE is calculated. Then the five percent of the properties that have the lowest probability of being within +/−5% PPE are excluded for each model.

It will be apparent to those skilled in the art that variations and modifications of the present invention can be made without departing from the scope or spirit of the invention. For example, the program language and code selected to implement the aspects of the present invention may be varied without departing from the intended scope of the claims. Further, the computer hardware selected to implement the aspects of the present invention may also be varied without departing from the intended scope of the claims. Thus, it is intended that the present invention cover all such modifications and variations of the invention, provided they come within the scope of the appended claims and their equivalents.

What is claimed is:

1. A computer program product for predicting a value of a property based on a weighted average of values predicted by at least two prediction models, the computer program product storing instructions for performing the steps of:

accessing predicted values, determined by the prediction models, for the property;

determining property-specific proportional prediction error information for The predicted values determined by each of the prediction models, the property-specific proportional prediction error information including a proportional prediction error that is proportional to a value of the property;

assigning a weight to the predicted value determined by each prediction model by using the property-specific proportional prediction error information; and generating a property-specific weighted average value based on combination of the weight and the predicted value determined by each prediction model and reporting the property-specific weighted average value to minimize prediction error during prediction of the property value.

2. The computer program product of claim 1, wherein the property-specific proportional prediction error information comprises a correlation coefficient and a standard deviation, and wherein the steps further comprise:

identifying the correlation coefficient by correlating the proportional prediction errors determined for a pair of prediction models; and determining the standard deviation for each prediction model by determining a standard deviation for a set of proportional prediction errors that exist for the model.

3. The computer program product of claim 2, wherein the steps further comprise using the standard deviations to determine the weight for each prediction model.

4. The computer program product of claim 2, wherein the steps further comprise:

using the correlation coefficients to assign the weight for each prediction model.

5. A computer program product for accurately predicting and reporting a value of a property based on a weighted average of values predicted by at least two prediction models, the computer program product storing instructions for performing the steps of:

accessing predicted values, determined by the prediction models, for the property;

determining property-specific proportional prediction error information for each predicted value determined by each prediction model, wherein the property-specific proportional prediction error information comprises a proportional prediction error, a correlation coefficient and a standard deviation, wherein the proportional prediction error is proportional to a value of the property, the correlation coefficient is identified by performing a correlation of the proportional prediction error determined for a pair of prediction models, and the standard deviation is determined for each prediction model by determining a standard deviation for a set of proportional prediction errors that exist for the model;

assigning a weight to the predicted value determined by each prediction model by using the property-specific proportional prediction error information; and generating a property-specific weighted average value based on combination of the weight and the predicted value determined by each prediction model and reporting the property-specific weighted average value to minimize prediction error associated with the predicted property value.

6. The computer program product of claim 5, wherein the steps further comprise determining a predicted standard deviation based on a correlation between a proportional prediction error variance and at least one other predefined variable.

7. The computer program product of claim 6, wherein the at least one other predefined variable includes a time interval since the last sale of the property.

8. The computer program product of claim 6, wherein the at least one other predefined variable includes a time interval since the last property assessment.

9. The computer program product of claim 6, wherein the at least one other predefined variable includes a magnitude of the property value.

10. The computer program product of claim 9, wherein the steps further comprise applying an exclusion filter to at least one prediction model.

11. The computer program product of claim 6, wherein the at least one predefined variable is a statistically significant variable for determining the weight assigned to each prediction model.

12. The computer program product of claim 1, wherein the property-specific proportional prediction error information includes a proportional prediction error distribution parameter that is correlated to at least one statistically significant variable.

13. The computer program product of claim 12, wherein the at least one statistically significant variable is a time interval since the last sale of the property.

14. The computer program product of claim 12, wherein the at least one statistically significant variable is a time interval since the last property assessment.

15. The computer program product of claim 12, wherein the at least one statistically significant variable is a magnitude of the property value.

16. The computer program product of claim 12, wherein the proportional prediction error distribution parameter is correlated to a first statistically significant variable for a first of the prediction models having a first prediction model type, and the proportional prediction error variance is correlated to a second statistically significant variable for a second of the prediction models having a second prediction model type.

17. The computer program product of claim 16, wherein the prediction models of the first prediction model type are a repeat sales model and/or tax assessment model, and the first statistically significant variable is a time interval.

18. The computer program product of claim 16, wherein the prediction models of the second prediction model type are a physical characteristic model and/or a neural network model, and the second statistically significant variable is a magnitude of the property value.

19. The computer program product of claim 12, wherein the proportional prediction error distribution parameter is a standard deviation.

20. The computer program product of claim 12, wherein the proportional prediction error distribution parameter is a variance.

* * * * *